(12) United States Patent
Kuwayama et al.

(10) Patent No.: US 6,229,776 B1
(45) Date of Patent: *May 8, 2001

(54) OPTICAL DISC APPARATUS FOR SELECTIVELY READING DATA AND AUDIO OUTPUT FROM CD-ROM

(75) Inventors: Yasunori Kuwayama; Toshihiko Yamaue, both of Daito (JP)

(73) Assignee: Funai Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,477

(22) Filed: Mar. 16, 1998

(30) Foreign Application Priority Data

Mar. 18, 1997 (JP) .................................................. 9-064177

(51) Int. Cl.[7] ........................................................ G11B 7/00
(52) U.S. Cl. .................................................................. 369/50
(58) Field of Search ................................ 369/124, 46, 47, 369/53, 50, 32

(56) References Cited

U.S. PATENT DOCUMENTS

| | | | |
|---|---|---|---|
| 5,726,958 | * | 3/1998 | Min ........................................ 369/32 |
| 5,740,356 | * | 4/1998 | Liang et al. ............................ 369/50 |
| 5,844,872 | * | 6/1997 | Kubo et al. ............................ 369/50 |
| 5,886,966 | * | 5/1997 | Ota et al. ............................... 369/50 |
| 5,963,520 | * | 6/1997 | Kubo et al. ............................ 369/50 |

* cited by examiner

Primary Examiner—Nabil Hindi
(74) Attorney, Agent, or Firm—Lackenbach Siegel Marzullo Aronson & Greenspan, P.C.

(57) ABSTRACT

An optical disc apparatus includes a microcomputer. The microcomputer causes an optical disc to rotate at a normal speed or a speed of a predetermined number times higher than the normal speed, according to a data read request supplied from a host computer. A PLL is controlled by the microcomputer so that it outputs, by adjusting the frequency-dividing ratio of a variable frequency divider, a first clock for normal-speed reproduction, a second clock for reproduction at a speed of a predetermined number of times, a third clock intermediate between the first clock and the second clock. When the optical disc is accelerated from the normal speed up to the speed of the predetermined number of times, the third clock is used. When the optical disc approaches a desired speed, the second clock is used to read data.

2 Claims, 4 Drawing Sheets

OPTICAL DISC APPARATUS FOR SELECTIVELY READING DATA AND AUDIO OUTPUT FROM CD-ROM

BACKGROUND OF THE INVENTION

1. Field of the Invention

This inventions relates to optical disc apparatuses, and more particularly to an optical disc apparatus which is arranged to read desired data out of an optical disc having audio data areas and CD-ROM areas coexisting thereon.

2. Description of the Prior Art

There are optical discs formed with a CD-ROM area having computer code data and an audio data area in a coexisting manner. In an optical disc apparatus loaded with such an optical disc, the optical disc is frequently switched of rotational speed or reproducing speed depending upon data to be read out. That is, the audio data is reproduced at a normal speed (1-times speed), whereas the computer code data is at a speed of a predetermined number times higher the normal speed (e. g. an 8-times speed).

The disc reproduced signal (reproduced EFM signal), read out of an optical disc through an optical pick-up, is configured by a plurality of pattern data different in pulse width (3T–11T). Accordingly, there is a necessity of accurately discriminating the pulse width by reproducing a clock that is synchronous with the reproduced EFM signal. The reproduced EFM signal is synchronously processed by a PLL circuit, wherein the reproduced EFM signal is compared with an oscillation clock of a VCO (voltage controlled oscillator) to control the VCO oscillating frequency in response to an error difference (voltage) between them. Consequently, the optical disc apparatus, requiring frequent changeover of reproducing speed, is structured to vary a PLL characteristic to meet with a reproducing speed, for example, by adjusting the frequency-dividing ratio of a variable frequency divider for dividing the VCO output.

Meanwhile, the audio data can be read only at a certain given frequency (normal speed), whereas the computer code data or the like can be read out over a comparatively broad speed range. That is, it is possible to read data, depending upon a frequency pulling range of the PLL circuit, from an optical disc (rotating, e.g. at a 5-times speed) before reaching an 8-times speed, as shown in FIG. 5. Nevertheless, it is impossible to read data during a time period (T) before the reproducing speed reaches a speed 5 times higher than the normal speed, as will be understood from FIG. 5. To this end, there has been a problem of worsening in a response characteristic to a data read request outputted from a host computer.

SUMMARY OF THE INVENTION

Therefore, it is a principal object of this invention to provide a novel optical disc apparatus.

It is another object of this invention to provide an optical disc apparatus which is capable of shortening a time to start reading data, in order to promptly deal with instructions given by a host computer.

This invention is an optical disc apparatus, arranged to read data out of an optical disc being driven by a disc motor rotating at a normal speed or a speed of a predetermined number times higher than the normal speed, comprising: a first clock output means for outputting a first clock for reading data at the normal speed; a second clock output means for outputting a second clock for reading data at the speed of the predetermined number times; and a third clock output means for outputting a third clock intermediate between the first clock and the second clock, wherein the third clock is used when the disc motor is shifted from the normal speed to the speed of the predetermined number times, and the second clock being used when the disc motor approaches the speed of the predetermined number times.

The disc reproduced (EFM) signal, read out of the optical disc rotating at the normal speed (1-times speed), is waveform-shaped (binarized) and then accurately discriminated of pulse width according to a first clock supplied from the first clock output means. Where reading data at a speed of a predetermined number times higher than the normal speed (e.g. at an 8-times speed) due to a data read request from the host computer, the disc reproduced signal read from the optical disc being accelerated by the disc motor is first discriminated of pulse width by a third clock intermediate between the second clock and the first clock.

That is, a third clock is generated that has a frequency pulling range covering over a range where data cannot be read out by the second clock for reproduction at a speed of a predetermined number times the normal speed, so that data can be read from the optical disc immediately after staring an acceleration. When the rotational speed of the disc motor approaches the speed of the predetermined number times the normal speed, i.e. when it reaches a reproducing speed permitted for the second clock, the data is continuously read by using a second clock selected by, for example, adjusting the frequency-dividing ratio of the variable frequency divider.

Also, where reading data by accelerating the optical disc from stoppage in a power-save mode up to a speed of a predetermined number times the normal speed, the data reading can be expedited in timing by using a third clock at a timing after starting the disc motor but the rotational speed of the disc motor is low.

According to this invention, a clock (third clock) is generated that is synchronous with the disc reproduced signal read from the optical disc rotating at a low speed so that data can be read out before the disc reaches a conventional high speed. Therefore, the response characteristic to instructions given by the host computer is drastically improved.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
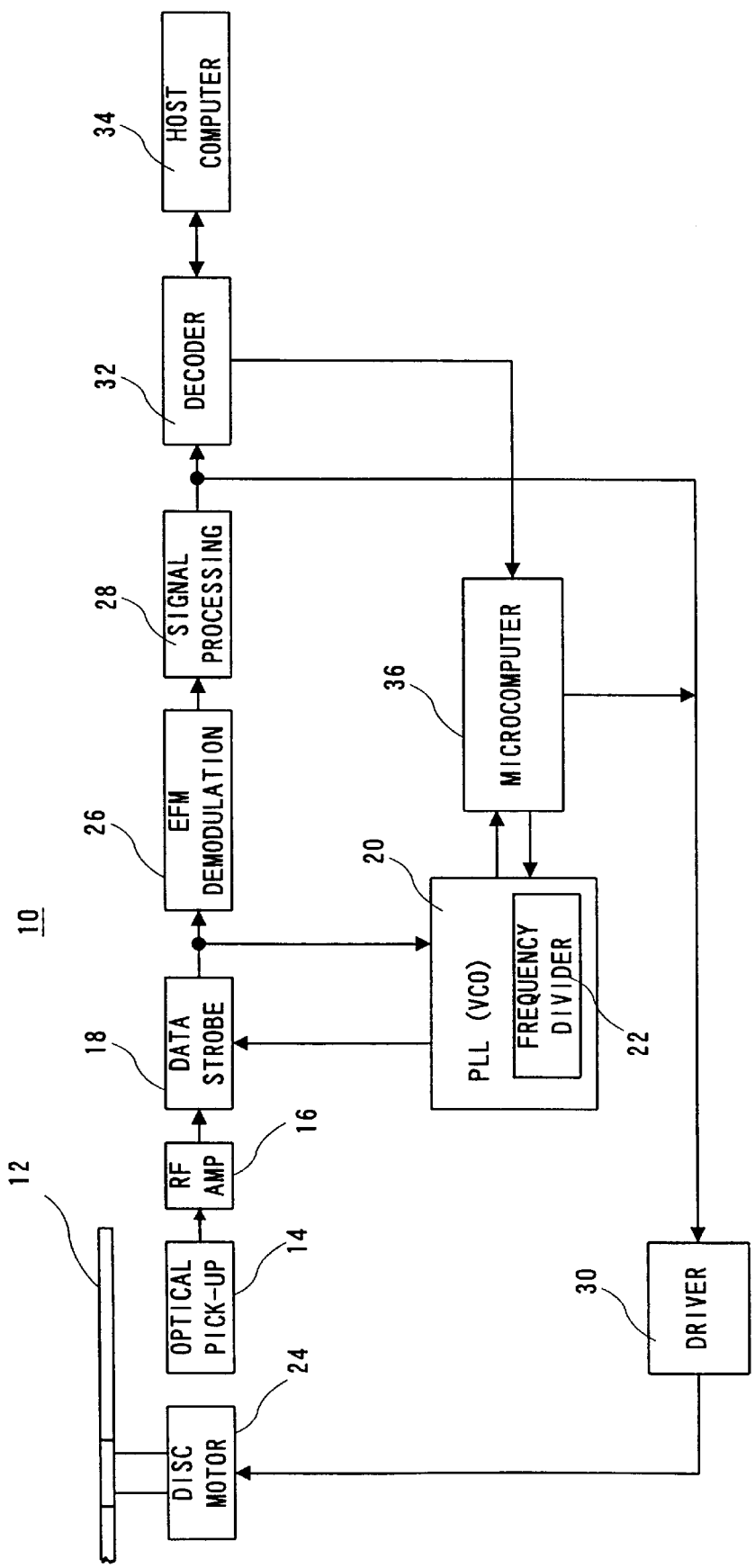
FIG. 1 is a block diagram showing one embodiment of this invention.

Referring to FIG. 1, an optical disc apparatus 10 in this embodiment includes an optical pick-up 14 that is servocontrolled in horizontal and vertical directions, with respect to an optical disc 12. Through this optical pick-up 14, desired data is read out of the optical disc 12 rotating at a normal speed or a speed of a predetermined number times higher the same speed in accordance with the data to be read.

The disc reproduced signal read from the optical disc 12, i. e. the reproduced EMF signal, is processed of amplification and waveform-shaping (binarizing) by an RF amplifier 16. Then the reproduced EMF signal is discriminated of pulse width according to a clock that is synchronism with the reproduced EMF signal and supplied from a PLL circuit 20. That is, the PLL circuit 20 includes, for example, a not-shown VCO (Voltage Controlled Oscillator) to generate a clock synchronous with the reproduced EMF signal based on an oscillating clock from the VCO.

The PLL circuit 20 also includes a variable frequency divider 22 with a controllable frequency-dividing ratio so that the oscillating clock from the VCO is frequency-divided by the variable frequency divider 22. The PLL circuit 20 in this embodiment creates a first clock for reading out data at a normal speed (1-times speed), a second clock for reading data at a speed of a predetermined number times higher than the normal speed (e. g. 8-times speed), and a third clock for reading data at a speed intermediate between the first clock and the second clock. The three clocks are selectively outputted in accordance with the rotational speed of the optical disc 12 (disc motor 24). That is, a data strobe circuit 18 is given any one of the three clocks different in frequency characteristics, in response to a reproducing speed.

The data strobe circuit 18 has an output supplied to a succeeding EMF demodulating circuit 26 where it is demodulated. The demodulated signal is then error-corrected by a signal processing circuit 28. At the signal processing circuit 28, a frame synchronizing signal is further detected as a speed signal from the disc reproduced signal. This synchronizing signal is PLL-processed by synchronizing with an oscillating signal of a quartz oscillator, not shown, so as to control the rotational speed of the disc motor 24 through a driver 30.

The disc reproduced signal subjected to predetermined processing by the signal processing circuit 28 is supplied to a host computer 34 through a decoder 32. The decoder 32 is to perform data transfer (DMA transfer) and interfacing to the host computer 34, so that the control data, such as for reproduction, double-speed reproduction and stopping, and the disc reproduced signal can be transmitted and received between the decoder 32 and the host computer 34.

On the optical disc apparatus 10 constructed as above is loaded an optical disc 12 having thereon coexisting audio data and computer code data. When the computer code data is reproduced by accelerating the optical disc 12 rotating at the normal speed (1-times speed) to a speed of a predetermined number times faster than the normal speed, the microcomputer 36 outputs to the PLL circuit 20 a VCO switch signal for switching the frequency-dividing ratio of the variable frequency divider 22, i.e. the third clock.

Figure 5:
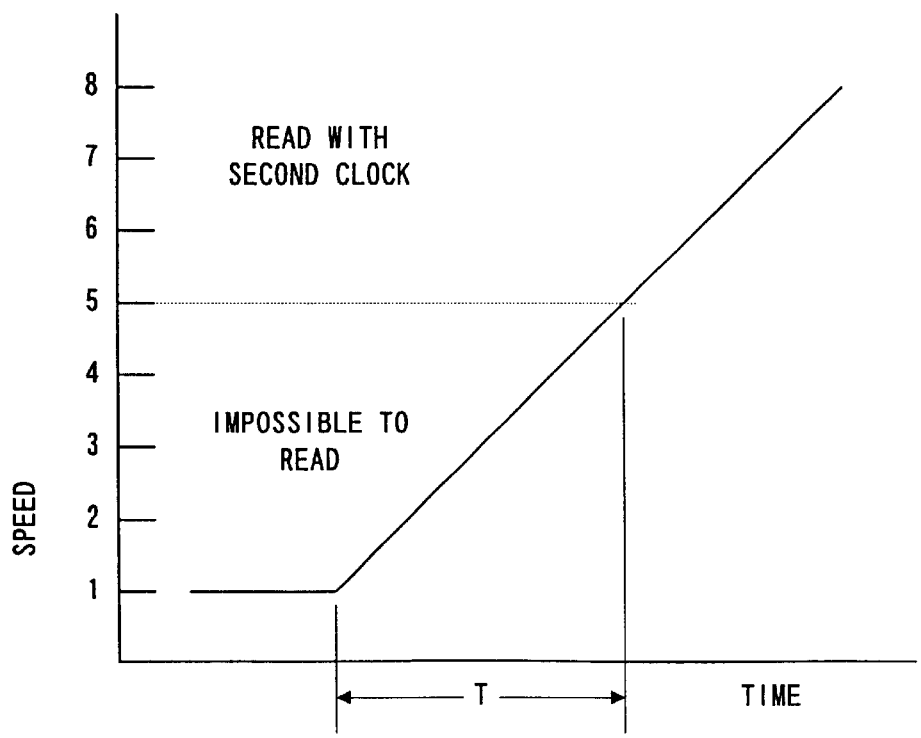
FIG. 5 is a graph showing a relationship between an optical disc rotational speed and a PLL circuit output in a prior art.

During a period before the rotational speed of the disc motor 24 reaches from the normal speed to a speed at which the data can be read with the second clock (e.g. the 5-times speed) (the period denoted by T in FIG. 5), output is made for a third clock which has a frequency pulling range lying intermediate between the first clock for normal speed reproduction and the second clock for 8-times speed reproduction. The third clock is used to read data from the optical disc 12 immediately after starting the acceleration, and then the second clock is used to read data after accelerating the optical disc 12 (disc motor 24) to a speed permitted for the second clock.

Figure 2:
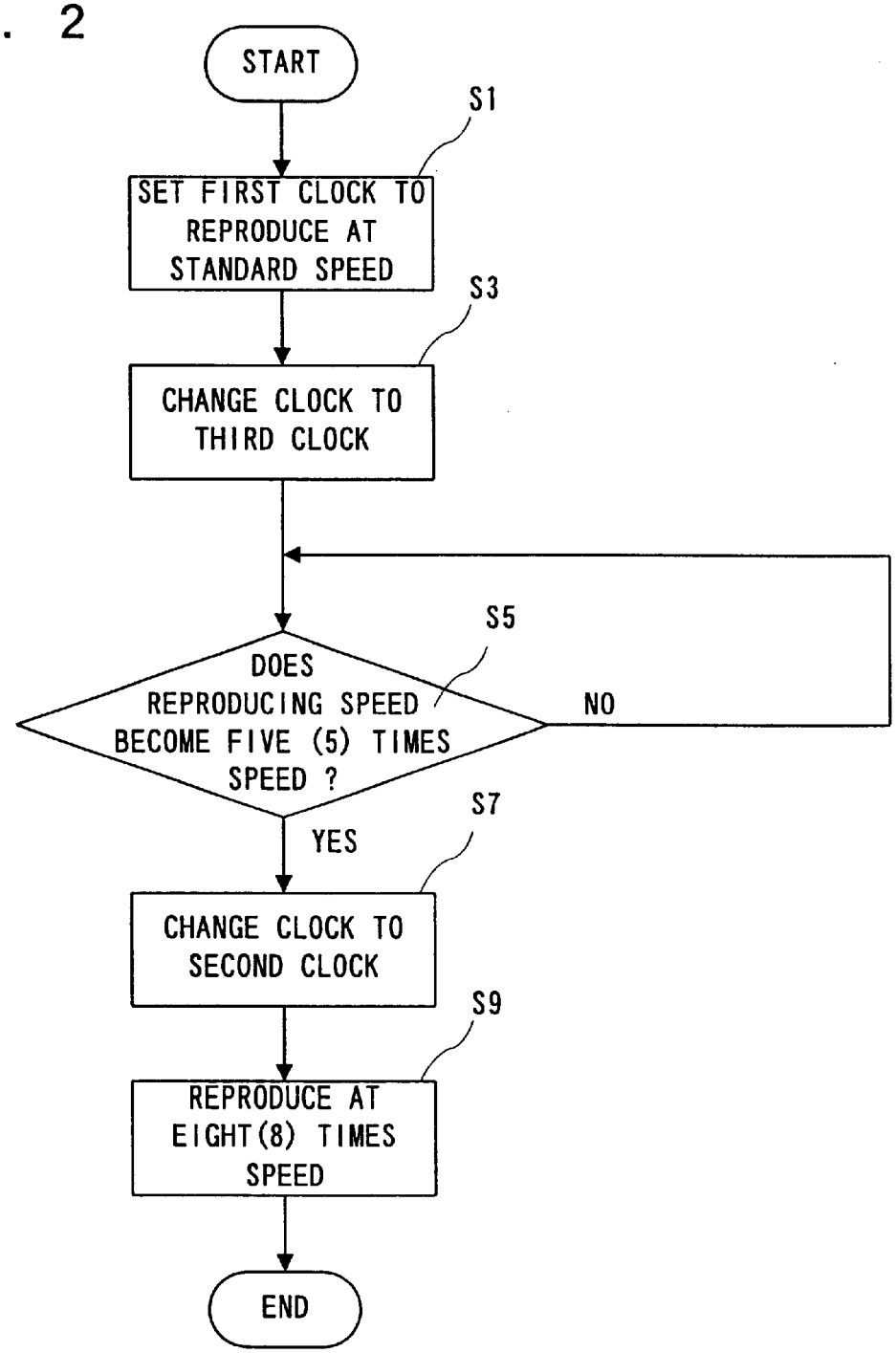
FIG. 2 is a flowchart showing one example of an operation for switching from a normal speed reproduction to an 8-times speed reproduction in the FIG. 1 embodiment.
Figure 3:
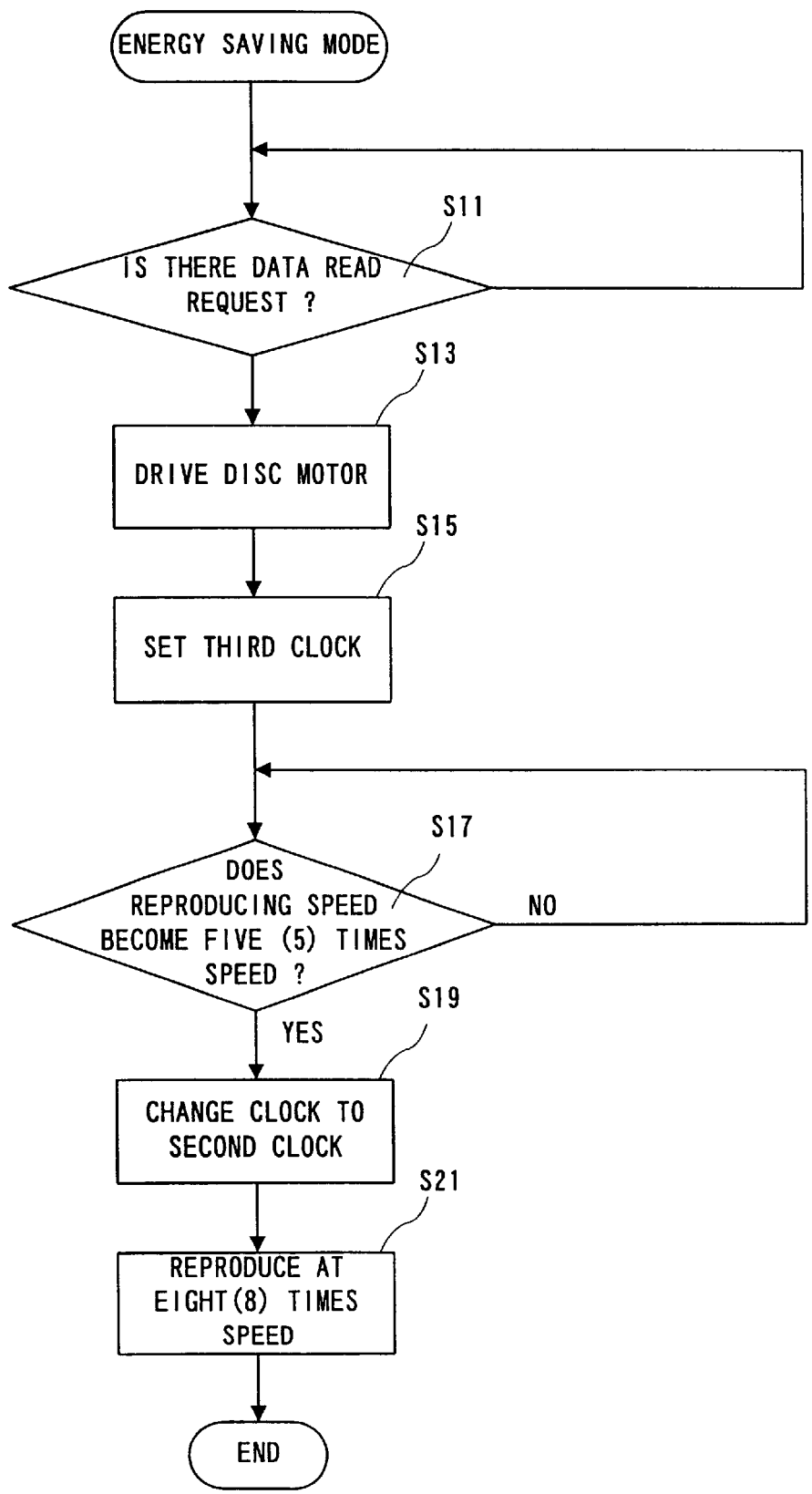
FIG. 3 is a flowchart showing one example of an operation when a data read request is given during a power-save mode in the FIG. 1 embodiment.

Referring to FIG. 2 and FIG. 3, the operation will be explained hereinbelow using a flowchart therein.

An optical disc 12 is loaded onto the optical disc apparatus 10, and then the control data (data read request) for reading audio data is delivered from the host computer 34 to the microcomputer 36. The microcomputer 36, at a step S1 in FIG. 2, outputs a VCO switch signal for selecting a first clock to the variable frequency divider 22, thereby taking out a disc reproduced signal as audio data.

Figure 4:
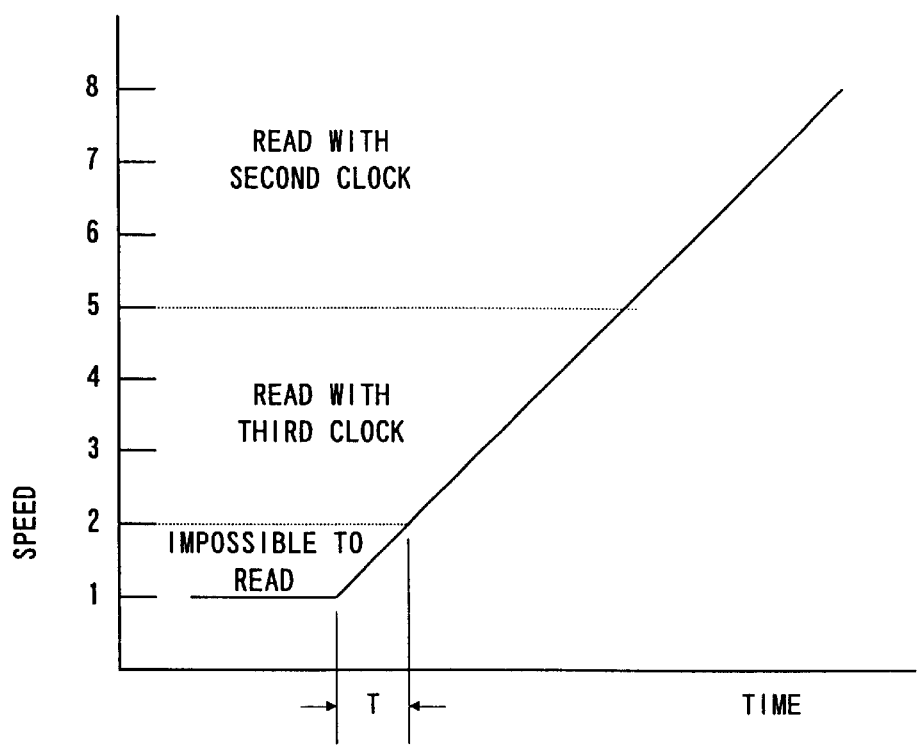
FIG. 4 is a graph showing a relationship between an optical disc rotational speed and a PLL circuit output in the FIG. 1 embodiment.

When a data read request for reading the computer code data is outputted from the host computer 34, the microcomputer 36 at a step S3 controls the driver 30 so as to accelerate the disc motor 24 (optical disc 12) and output a VCO switch signal for selecting a third clock to the variable frequency divider 22. As stated before, the third clock has a characteristic frequency (frequency pulling range) that lies between the first clock characteristic frequency and the second clock characteristic frequency. Accordingly, the data reading with a third clock becomes possible after the rotational speed (reproducing speed) of the disc motor 24 reaches a speed twice higher than the normal speed, as shown in FIG. 4.

Then the microcomputer 36 determines at a step S5 whether or not the rotational speed of the optical disc 12 (disc motor 24) attains a speed of 5 times faster than the normal speed. If the determination is "YES", a second clock is selected at a succeeding step S7 by adjusting the frequency ratio for the variable frequency divider 22. That is, the microcomputer 36 determines a reproducing speed from an output of the variable frequency divider 22. When the reproducing speed reaches a 5-times speed for reading with a second clock, the data reading with the second clock is started for performing 8-times speed reproduction. At a succeeding step S9, the data is read at the 8-times speed. Incidentally, if "NO" is determined at the step S5, that is, if the reproducing speed does not reach the 5-times speed, the process of step S5 is repeated until the reproducing speed becomes the 5-times speed.

Where no data read request is outputted for a predetermined time period from the host computer 34, the microcomputer 36 temporarily stops the disc motor 24 to forcibly select a power-save mode, in order to suppress power consumption. During this power-save mode, the microcomputer 36 determines at a step S1 in FIG. 3 whether a data read request was outputted from the host computer 34 or not. If there is a data read request ("YES" is determined), the microcomputer 36 drives the disc motor 24 at a step S13, and selects a third clock by adjusting the frequency-dividing ratio of the variable frequency divider 22 at a step S15. With this third clock, desired data (computer code data) is read out of the optical disc 12 rotating, for example, at a speed twice the normal speed.

The microcomputer 36 determines at a step S17 whether the reproducing speed becomes, for example, a 5-times speed or not. If "YES" is determined, the microcomputer 36 selects a second clock at a step S19, to perform data reading from the optical disc 12 rotating at a speed of 5 times to 8 times higher than the normal speed by using the second clock.

According to this embodiment, the third clock is provided which has a frequency pulling range for giving a reproducing speed at which data can not be read by the second clock for reading data at a speed of a predetermined number times higher than the normal speed. Accordingly, desired data can be read out of the optical disc rotating at a low speed immediately after starting an acceleration. As can be understood from FIG. 4, the time period (T) for which data cannot be read is shortened to approximately 1/10 of that of the conventional (in this embodiment T=approx. 100 msec.). The responsibility to a data read request from the host computer can be drastically improved to thereby smoothen operations such as OS, etc. Particularly, the inventive apparatus is effective for reproducing data from an optical disc by accelerating from a stoppage in a power-save mode to a high rotational speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc apparatus, arranged to substantially eliminate reproduction reading gap while reading data and audio output information from an optical disc being driven by a disc motor selectively rotating and shifting between a normal speed and a speed of a predetermined number of times higher than said normal speed, comprising:

clock output means for outputting a first clock for reading data at the normal speed, a second clock for reading data at the speed of said predetermined number of times, and a third clock intermediate between said first clock and the second clock, and driver circuit means for selectively receiving said first, second and third clocks in accordance with the rotational speed of said optical disc required for reading audio and data information, said third clock being used when said disc motor is shifted from normal speed to the speed of predetermined number of times, and said second clock being used when said disc motor approaches the speed of said predetermined number of times, whereby the optical disc apparatus can continue to read data substantially without interruption even while the rotational speed of the optical disc is being shifted.

2. An optical disc apparatus according to claim 1, further comprising a turn-on means for turning on said disc motor each time a data read request comes from a host computer, wherein the third clock is used when turning on said disc motor by said turn-on means, the second clock being used when said disc motor approaches the speed of the predetermined number of time.

* * * * *